(12) United States Patent
Jäger et al.

(10) Patent No.: US 6,557,684 B1
(45) Date of Patent: May 6, 2003

(54) FREE-WHEELING HUB

(76) Inventors: Gerrit Jäger, Rue de Tilles 28, Péry (CH), CH-2603; Stefan Spahr, Krähenbergatrasse 18 b, Lengnau (CH), CH-2543

(*) Notice: Subject to any disclaimer, the term of this patent is extended or adjusted under 35 U.S.C. 154(b) by 0 days.

(21) Appl. No.: 09/857,908
(22) PCT Filed: Dec. 8, 1999
(86) PCT No.: PCT/EP99/09650
  § 371 (c)(1),
  (2), (4) Date: Aug. 3, 2001
(87) PCT Pub. No.: WO00/34057
  PCT Pub. Date: Jun. 15, 2000

(30) Foreign Application Priority Data
Dec. 8, 1998 (DE) .................... 198 56 627

(51) Int. Cl.⁷ .............................. B60B 27/02
(52) U.S. Cl. ..................... 192/64; 301/110.5
(58) Field of Search ............. 192/64, 45.1, 110 B; 301/110.5

(56) References Cited

U.S. PATENT DOCUMENTS 4,580,670 A * 4/1986 Nagano .................. 192/46
5,332,294 A * 7/1994 Haeussinger .............. 192/64
5,676,228 A * 10/1997 Lin ........................ 192/64

FOREIGN PATENT DOCUMENTS

| DE | 3302267 | * | 7/1984 |
| DE | 9419357 | * | 1/1995 |
| DE | 29601861 | * | 4/1996 |
| EP | 0791482 | * | 8/1997 |

* cited by examiner

Primary Examiner—Saul Rodriguez
(74) Attorney, Agent, or Firm—Spencer Fane Britt & Browne LLP

(57) ABSTRACT

Freewheel hub, especially for bicycles and similar contrivances comprising a hub axle, a hub shell arranged concentrically thereto, a rotator arranged concentrically to said hub axle for receiving a sprocket wheel with pinions and a freewheel means disposed with ratchet pawls. Roller bearings are employed for the rotatable support of said hub shell relative the hub axle and for the rotatable support of said rotator relative said hub shell and comprise roller bodies each respectively disposed at a predetermined distance from one another.

37 Claims, 4 Drawing Sheets

FREE-WHEELING HUB

Priority benefit under 35 U.S.C. §119 or 35 U.S.C. §365 is claimed to German Patent Application No. 198 56 627.1 filed Dec. 8, 1998 and Patent Cooperation Treaty Application No. PCT/EP99/09650 filed Dec. 8, 1999.

FIELD OF THE INVENTION

The present invention relates to a freewheel hub which is especially suitable for bicycles. However, this is not the only possible use; freewheel hubs of this kind may also be employed as drive for wheelchairs and other muscle-driven or non-muscle-driven vehicles and contrivances. For purposes of simplification, however, the invention will be described in the following with sole regard to its use with bicycles, whereby said description shall not in any way be deemed restrictive for the invention's realm of application.

BACKGROUND OF THE INVENTION

Freewheel hubs for bicycles are frequently realized with a ratchet freewheel in which rotatably mounted ratchet pawls are arranged between two rotating members and which effect a form-fit connection between these two members in one rotational direction and in the other rotational direction, the idle direction, move into a position in which no transmission of force can transpire between said rotating members.

The demands placed on such freewheel hubs are very high especially in the field of high performance sports, but not limited solely thereto.

On one hand, the freewheel hub must reliably take up intense forces; on the other hand, it must also function reliably, even over prolonged periods of time. Furthermore, the friction induced in the hub, in drive mode as well as in idle mode, must be as low as possible.

It is customary in the fields of professional and semi-professional cycling to service such hubs prior to every or almost every use. Therefore, it is also necessary that the hub be easily dismantled and reassembled.

It is therefore the task of the present invention to provide a freewheel hub especially for bicycles which withstands the most extreme loads, has low frictional values, provides reliable and sound operation, and which can be easily maintained.

This task is solved in accordance with the present invention by the object of claim 1, claim 17 or claim 18.

Preferred embodiments of the invention constitute the subject matter of the subclaims.

SUMMARY OF THE INVENTION

The present invention provides a bicycle hub with a high operational reliability and durability which is easy to maintain and which attains, upon transmission of force, a reliable, durable and form-fit connection combined with low frictional loss, for example even during a downhill ride when the pedal crank is in idle.

The hub according to the present invention comprises a hub axle, a hollow hub shell arranged concentrically thereto, a rotator arranged concentrically to said hub axle and on which at least one gear may be arranged, and a ratchet pawl freewheel means.

Roller bearings are utilized to support the individual components. The roller bodies of one or of all roller bearings are disposed at a predetermined distance from one another. Preferably standardized, respectively industrially fabricated, roller bearings are used according to, for example, DIN or ISO norms. The use of such roller bearings precludes the need for adjusting bearing play, a procedure which is costly and vulnerable to mistakes. In the bicycle industry such roller bearings are also known by the term "industrial bearings" as such bearings are usually industrially fabricated and are standardized.

Employing roller bearings or industrial bearings for bearing purposes has numerous advantages since the standard of quality of such industrially fabricated bearings is usually very high by virtue of the large number of pieces produced. A defective worn bearing can be simply and quickly replaced. The use of standardized bearings allows for acquiring high quality replacements quickly and at reasonable cost throughout virtually the entire world.

The rear wheel hub according to the present invention further comprises a freewheel means provided with ratchet pawls which is configured in such a way that rotator torque in the forward drive direction is transmitted to the hub shell, whereby the freewheel means is essentially configured radially so that upon a change in position of pawl, a frictional or form-fit connection is attained between the rotator and the hub shell.

The hub according to the present invention has numerous advantages.

The utilization of such roller bearings in which the roller bodies of a bearing are arranged at a predetermined distance to one another grants a high degree of reliability and durability to the inventive hub. It is specifically due to the individual roller bodies having a certain, usually fixed, spacing to one another that an inadvertent and frictional contact of the individual roller bodies can be avoided, a situation which can lead to increased wear and even deterioration of the roller bodies. With increasing wear, the outer contour of roller bodies may possibly deviate from their ideal, which can lead to cracking and waving of the races; this situation can conceivably destroy the entire hub.

Through the utilization of roller bearings preferably having an inner ring and an outer ring, between which balls, cylinders, cones or needles are usually retained in a bearing cage, an especially high degree of reliability and durability is achieved in the hub according to the present invention.

Industrially fabricated roller bearings ensure a high degree of quality and durability. Employing roller bearings having an inner ring and an outer ring has the result that a deterioration of a roller bearing does not usually lead to a progressive destruction of the hub, since the replacing of the complete roller bearing also encompasses replacing the inner and outer roller bearing race. In conventional bicycle hubs, a cone-shaped section on the hub axle often serves as the inner roller bearing race, while the outer race is formed in the hub shell. Upon deterioration of the roller bodies due to exceeding of their operating life or due to penetration of dust, the entire hub can thus be rendered unusable.

In a further preferred embodiment of the bicycle hub according to the present invention, the hub has a hollow hub axle which is so configured, in contrast to conventional hub axles, that the ratio, the difference respectively, between the outer and inner diameter is small, respectively the well thickness of the hollow hub axle is relatively thin, preferably between 0.5 and 3 mm and especially preferred between 1.7 and 2.3 mm; preferably at approximately 2 mm.

In a further preferred embodiment of the bicycle hub according to the present invention, at least two adjacently arranged roller bearings are utilized at one bearing position, instead of the just one roller bearing customarily utilized in conventional bicycle hubs. The utilization of two roller bearings at one position where normally only one roller bearing would be used has the advantage that the stress loaded on the individual bearing is smaller and thereby bearings of smaller outer diameter may be used compared to when only one bearing is used at this position. A reduction in bearing outer diameter leads to less material volume and, consequently, to a reduction in the total hub weight. This is of particular importance in sporting circles, but certainly not limited solely thereto.

The utilization of such a hollow hub axle or the use of two roller bearings at positions where normally only one roller bearing would be used is described in detail in the parallel application of the same applicant (attorney's file No. 4582P197), which was filed with the German Patent Office on the same day as the present application and which describes a bicycle hub. The description, figures and entire contents of said application is consequently integrated herewith into the disclosure of the present application.

It is furthermore possible to mount one or several of the roller bearings utilized for bearing as floating bearings, in particular as axially floating bearings, whereby the fitting accuracy of said floating bearing is between 0.02 mm and 0.5 mm, preferably between 0.05 mm and 0.15 mm; particularly preferred at about 0.1 mm. When two adjacent roller bearings are utilized for bearing, it is especially preferred that one of the two be a floating bearing.

Preferably at least one bearing is a floating bearing on at least one side of the nub. Especially preferred is the most outward roller bearing relative the hub center being a floating bearing in order to avoid sustained tension in the bearing.

In a preferred embodiment of the bicycle hub according to the present invention, at least one of the prefabricated roller bearings has a seal for protection against dust and/or water. Preferably, the roller bearings for bearing the hub shell and the rotator with respect to the hub axle are provided with seals for protection against dust and/or water, and especially preferable is that all the roller bearings employed are provided with seals for protection against dust and water. Particularly preferred is the utilization of standardized, sealed roller bearings.

Preferably, roller bearings which are essentially maintenance-free are utilized. The use of maintenance-free and/or sealed roller bearings is especially advantageous since this increases the bearing operation life, making the hub more reliably sound for the cyclist.

In a preferred embodiment of the bicycle hub according to the present invention, one or respectively all of the roller bearings employed are grooved ball bearings which can be realized in accordance with a previous embodiment as maintenance-free or sealed grooved ball bearings. The utilization of grooved ball bearings is especially advantageous since these ball bearings can also take axial forces in addition to radial forces.

In a further preferred embodiment of the hub according to the present invention, in addition to grooved ball bearings, one or several needle bearings are also employed.

Preferably, grooved ball bearings are utilized for bearing the hub shell and the rotator with respect to the hub axle, while one or two grooved ball bearings or even one or two needle roller bearings may be utilized for bearing the rotator with respect to the hub shell.

Said bearing for supporting the rotator with respect to the hub shell may be provided with an inner ring and an outer ring, or with only one inner ring or one outer ring, or with only one ball retainer, a so-called needle ring respectively, in order to keep the overall structural height in radial direction as small as possible.

Especially when utilizing needle rings, but not limited solely thereto, it is possible to keep the radial space necessitated for the bearing small. This is especially advantageous since a smaller diameter of this bearing leads to smaller (material) volume and thus to overall less weight to the entire hub.

In a preferred embodiment of the bicycle hub according to the present invention, a freewheel carrier means is provided which is rigidly connected to the hub shell. The hub shell is made of metal, preferably a light metal and especially preferably, it is made from an aluminum alloy or a similar light metal. The freewheel carrier means is a separate component which is likewise preferably made from metal, light metal or an aluminum alloy; however particularly preferred is that it is made from hardened steel or similar material. The rotator is made of metal, preferably light metal, aluminum alloy respectively. In cases where especially high stress loads occurs, for example as in tandems, the rotator can also be made from steel, hardened steel respectively.

In a preferred embodiment, the freewheel carrier means is of essentially cylindrical shape and has a through borehole. At its end orientated to the hub shell, the freewheel carrier means has a polygonal outer cross-section profile in a cross-section perpendicular to the hub axle. The outer diameter of said freewheel carrier means at this end is dependent upon circumferential angle. The end of said freewheel carrier means as seen in axial direction may be of gear-like configuration, the sprockets or teeth of same being of pointed or round or sinusoidal shape. It is especially preferred that several, in particular 9, radial bulges are symmetrically distributed across the circumferential angle.

The hub shell is preferably provided with a polygonal shaped notch at a section of the rotator side perpendicular in cross-section to the hub axle which serves to essentially provide an interlocking form-fit reception of the polygonal shaped end of the freewheel carrier means. According to the design of the polygonal shaped end of the freewheel carrier means, the notch is such configured in the hub shell so as to enable a form-fit connection between said freewheel carrier means and said hub shell which is torque-proof and essentially free of play.

In a further preferred embodiment of the hub according to the present invention, a screw means is provided comprising a screw having a through borehole through its screwhead and screw shaft. A (male) thread is provided at least at the end of the screw shaft opposite the screwhead which can be screwed into a (female) thread of the freewheel carrier means at its end facing the hub center. The freewheel carrier means is mounted by inserting same into the hub shell. Due to the polygonal-like outer and inner profile of the freewheel carrier means and hub shell, a torque-proof and interlocking form-fit connection of freewheel carrier means and hub shell results. The screw of said screw means is introduced through the hollow center of the hub shell at its distal end from the freewheel carrier means, through a hub shell borehole corresponding to the screw shaft diameter, and screws into the freewheel carrier means. In the configuration according to the present invention, the screwhead positions against a stop in the hub shell so that a frictional connection in axial direction transpires between the freewheel carrier means and the hub shell.

The screwhead has notches or projections so that it can be turned by means of a tool.

In a further preferred embodiment of the hub according to the present invention, the freewheel means encompasses at least one ratchet pawl which is arranged on said freewheel carrier means and which engages into a groove or a corresponding tooth meshing on the inner peripheral surface of the rotator for the purpose of transmitting torque. Said rotator meshing is preferably configured such that in peripheral direction, the side of each tooth within the meshing ascends gradually, and then abruptly drops off at the top of said tooth.

Upon transmission of torque, the preferably two, three, four or more ratchet pawls of the freewheel carrier means engage in the rotator meshing and transfer the drive torque from the steep side of the gearing to the freewheel carrier means and then on to the hub shell. When the pedals are at a standstill, the pawls glide over the flat sides of the meshing and no torque is transmitted.

A number of recesses corresponding to at least one of said number of ratchet pawls which serve for receiving the paw is and which are preferably round or cylindrical in shape are preferably arranged in peripheral distribution at a central section of the freewheel carrier means.

Said ratchet pawls have an accordingly shaped end and are arranged in the corresponding recesses such that their second engaging ends can engage in the tooth meshing on the inner peripheral surface of the rotator.

The central section of the freewheel carrier means, on which the freewheel means is disposed, is preferably provided with a groove in peripheral direction in which an annular spring is arranged, and which stresses the freewheel elements or pawls such that the engaging ends of said pawls are raised in order to bring them into engagement with the rotator meshing. Said spring is preferably realized as a Q-spring and rings the freewheel carrier means at an angle of more than 360°. A small end section can be bent about 90° at an end of the annular-shaped, Q-shaped spring respectively, said end section being then aligned essentially parallel to the axle in a determinate hub configuration and if necessary protruding as an axial bulge to the freewheel carrier means in order to fix same in peripheral direction. Employing a C-shaped spring is also possible.

Adjacent to this central section of the freewheel carrier means in the direction of the hub shell, a cylindrical section of larger diameter may be disposed on said freewheel carrier means on which at least one roller bearing is arranged for the purpose of rotatably supporting the rotator with respect to the freewheel carrier means and thus the hub shell.

It is preferred that a roller bearing is arranged essentially between the rotator and the hub shell near the rotator end distal the hub shell for the purpose of rotatably supporting the rotator with respect to the hub axle.

A bearing arrangement of this type, in which the rotator is rotatably supported on the one side of the freewheel means relative the hub shell and on the other side of the freewheel means relative the hub axle, is especially advantageous since it virtually excludes the rotator exhibiting pronounced bowing under load with respect to the hub shell, the freewheel carrier means respectively, even upon large burdens of torque as may arise, for example, during rides over mountainous terrain. Such bowing under load can invoke a single-sided stress on the freewheel elements, the ratchet pawls of the freewheel means respectively, which in turn subjects these components to highly increased wear.

Such a stable bearing essentially ensures that rotator torque will always be reliably transmitted to the hub shell.

A rotator exhibiting heavy bowing under load relative the hub shell and/or the freewheel means may lead to, especially when cornering, the freewheel elements or the freewheel means ratchet pawls being unable to transmit torque to the hub shell.

Among the plurality of advantages of the hub according to the present invention is its reliable transmission of rotator torque in virtually all conceivable cycling circumstances.

In order to rotatably support the freewheel means relative the hub axle, a roller bearing is preferably arranged on the freewheel carrier means side distal the hub center.

In a preferred embodiment of the hub according to the present invention, the roller bearings for bearing the rotator relative the axle and for bearing the freewheel means relative the hub axle are arranged adjacently to one another and preferably separated only by means of a type of washer, a lock washer, or such similar component.

In a preferred embodiment of the hub according to the present invention, the hub may essentially be detached manually without the use of tools. Furthermore, the rotator as well is preferably able to be manually detached, removed respectively, without the need for tools.

In this preferred embodiment of the present invention, end retaining elements which are either screwed or simply just slipped onto the hub axle are provided on both ends of said hub axle.

Should said hub end retaining elements be screwed on, they preferably have a female threading while the hub axle end section has a male threading. A tool can then preferably be utilized for unscrewing said hub end retaining elements when dismantling the hub.

Should said hub end retaining elements be slipped on, they can be pulled off manually.

The further dismantling of the hub essentially always takes place without the need for tools. In all embodiments, the rotator is preferably manually extractable; consequently the interior enclosed by the rotator, for example the freewheel means, is accessible in a simple and easy manner when performing cleaning and maintenance duties. Especially advantageous hereby is that no roller bodies, for example balls or even ratchet pawls, can fall out of the hub after the rotator has been extracted.

In a preferred embodiment of the hub according to the present invention, a hub end retaining element in the form of a right adapter ring with a preferably V-shaped sealing means is slid onto the hub axle at the right-hand side of the hub shell on which the rotator is arranged, whereby an end, respectively a sealing wall of said V-shaped sealing means, is supported on a rotator dust shield gasket preferably situated adjacent the roller bearings for bearing the rotator on the hub axle.

On the left-hand side of said hub shell, a hub end retaining element in the form of a left adapter ring likewise With a preferably V-shaped sealing means is preferably slid onto the hub axle, An end of the V-shaped sealing means is supported on the hub shell and/or a roller bearing serving for the left-hand side bearing of said hub shell relative the hub axle for the purpose of preventing the penetration of dust and/or water into the hub interior.

It is furthermore preferred that an annular recess or groove is provided along the inner peripheral surface on the right inner side of said hub shell, the side an which the rotator is disposed, said recess or groove having a rounded-off shape in a cross-section parallel to the hub axle and configured such that the diameter on the right-hand end of said hub shell is smaller than the maximum diameter of said recess.

A sealing means is preferably disposed essentially between said rotator and said hub shell, which is preferably at least partially made of a flexible material and which fundamentally prevents the intrusion of dirt and/or water into the hub.

Said sealing means is preferably arranged on an outer surface of said rotator. Particularly preferred is said sealing means being disposed in a section of the annular recess of the hub shell and configured in such a way that an external pollutant load induces an increase in the sealing effect.

A configuration of this type is particularly advantageous in that the sealing effect intensifies upon increasing load, thus enabling an efficient sealing effect without an increase in frictional loss during standard operation.

In accordance with a further preferred embodiment of the inventive hub, the sealing means between the rotator and the hub shell is formed in a V-shape and situated so that the top of said V-shaped sealing means is orientated toward the hub center such that the V opens up outwardly.

Preferably a first sealing wall of the V-shaped seal situated between rotator and hub shell is positioned against the rotator, and the second sealing wall protrudes in to contact with the annular recess of the hub shell.

Such a configuration has numerous advantages, since the sealing effect of the seal is automatically increased upon being burdened by water splashed from outside, since the two sealing walls of the V-shaped seals, preferably at least partially made from flexible material, are pressed apart and the second sealing wall is then consequently pushed or pressed against the annular recess in the hub shell.

Hence, an intensified sealing effect of said sealing means is achieved while frictional losses are kept low during normal circumstances.

In a preferred embodiment of all the configurations as described previously, at least one of said sealing means comprises an additional labyrinth seal preferably connected in series to one of said flexible sealing means.

It is particularly preferred that an additional labyrinth seal is disposed in the sealing means between hub axle and hub shell on the left-hand side of the hub; an additional labyrinth seal can however also be arranged on the right-hand side of the hub in the sealing means of the hub axle relative the rotator and in the latter described sealing means above between rotator and hub shell.

The further embodiments of a hub according to the present invention includes characteristics such as described in the same applicant's application No. DE 197 31 451.1, filed with the German Patent Office on Jul. 22, 1997 or No. DE 198 47 673.6, filed with the German Patent Office on Oct. 15, 1998. The contents of said applications are therefore integrated into the disclosure of the present application. The configuration of at least one or several sealing means, as is described in the same applicant's DE 197 31 451.1 with reference to FIGS. 1, 2a and 2b, is especially preferred.

DESCRIPTION OF THE DRAWINGS

Further advantages, characteristics and possible applications of the present invention will now be described with respect to embodiments and in reference to the drawings, which show:

FIG. 2b an sectional view along A—A through the hub shell according to FIG. 2a;

FIG. 7a a side view of an annular spring; and

FIG. 7b a top view of an annular spring of FIG. 7a.

DETAILED DESCRIPTION

Figure 1:
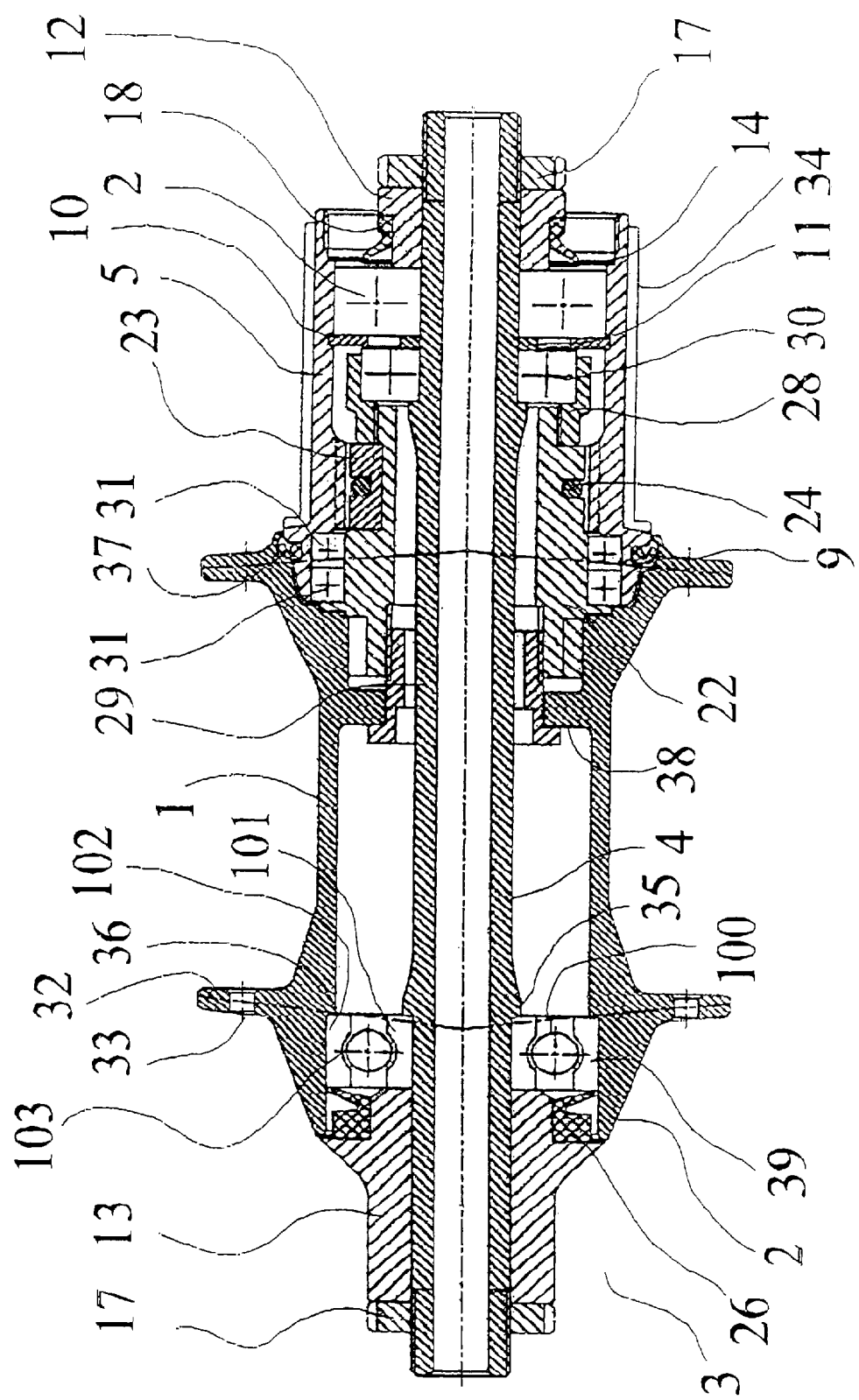
FIG. 1 a sectional view of a first embodiment of a hub according to the present invention.

A first embodiment of an inventive hub 3 is sectionally represented in FIG. 1. The hub 3a comprises a hub axle 4, a hub shell 1 and a rotator 5. The hub shell is provided with flanges 32 which have boreholes 33 for receiving spokes.

In practically all bicycles, the pinion for the drive, the pinion package for a cascade connection respectively, is arranged on the right side of a bicycle with respect to direction of travel. Accordingly, the following will also refer to the left and right parts of the hub, whereby said orientation corresponds to FIG. 1.

Hub shell 1, provided with a through borehole, has a borehole concentric to hub axle 4 in its left section in which a bearing seat 39 is arranged on a stop 36 in the hub shell. Said bearing seat serves for receiving a grooved ball bearing 2, which is axially supported toward the hub center by stop 36 in the hub shell. The inner race 101 of said grooved ball bearing 2 is arranged on hub axle 4 and is axially supported to the right by a stop 35 on said hub axle. The ball bearing comprises further a deep groove 103 and an outer race 102. A bearing cage 100 may or may not be provided.

Left of said grooved ball bearing 2 in the left half of the hub, a left hub end retaining element in the form of a left adapter ring 13 is arranged which is interchangeable for fitting to different types of bicycle frames. A cylindrical surface in the right end section of said left adapter ring serves to receive a V-shaped sealing ring 26 made of a flexible material in order to prevent the admittance of water and dust into the hub shell. Said sealing ring 26 is a labyrinth seal, respectively a sealing gap connected in series between adapter ring 13 and hub shell 1.

The V-shaped sealing ring 26 comprises two sealing walls or sealing sections of which the sealing wall orientated towards the hub center is shaped so slimly that the ratio of its radial length to its axial thickness is more than two. The sealing wall orientated towards the hub center terminates in a section near the hub shell and the grooved ball bearing 2 and contacts the outer race ring of said grooved ball bearing 2.

A knurled disk 17 is screwed onto an axle end section at the left end of the hub axle in the present embodiment in order to reliably hold the left adapter ring on the hub axle.

A ratchet carrier 22 is arranged on the right-hand side of the hub, rigidly connected to hub shell 1 via screw 29.

During mounting, said ratchet carrier 22 is introduced in the hub shell from the right and said screw 29 extends through to said borehole in hub shell 1 from the left, the male thread of screw 29 screws with the female thread of ratchet carrier 22 on the left side of said ratchet carrier. The screwhead of screw 29 is supported against a stop 38 in hub shell 1.

Two grooved ball bearings 31 of commensurate configuration are adjacently arranged in a left section of ratchet carrier 22 in order to rotatably support rotator 5 relative to ratchet carrier 22.

Ratchet pawls 23 are symmetrically distributed across the periphery in a section to the right of said grooved ball bearings 31 which are engageable with grooves in rotator 6 in order to transmit rotator torque to the ratchet carrier and consequently the hub shell.

Figures 7A, 7B:
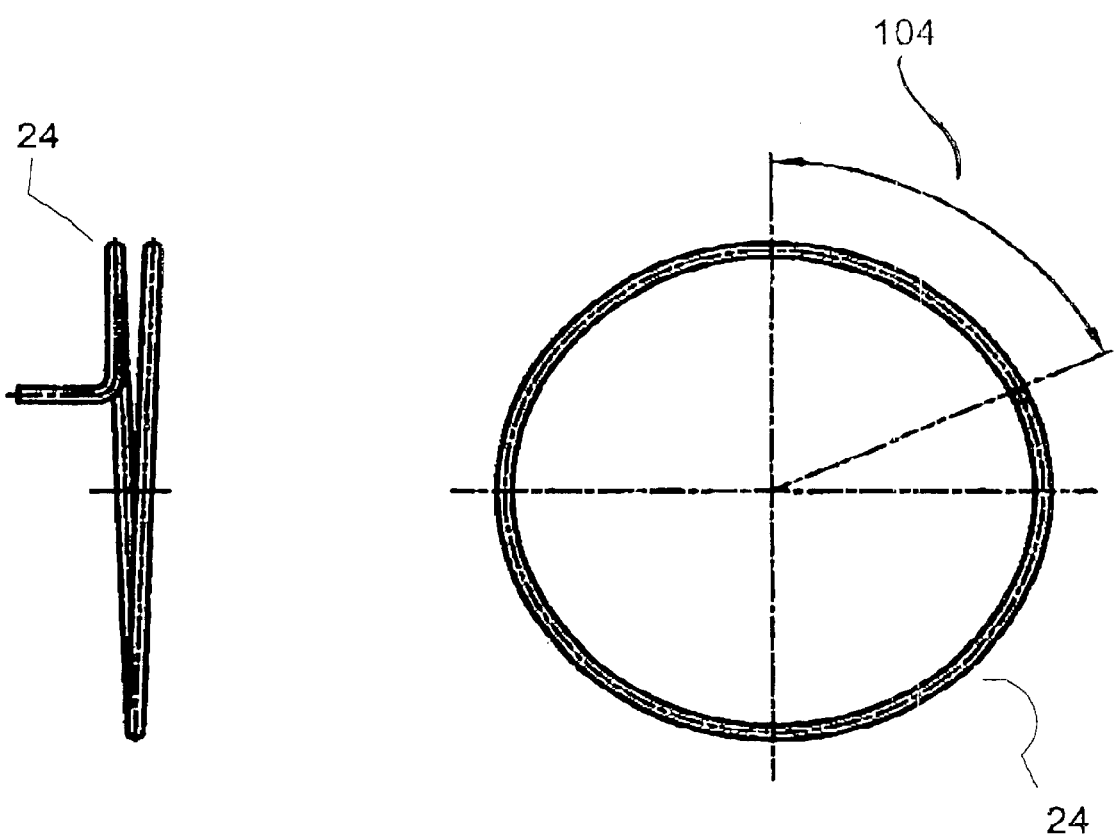

A central, respectively concentric, annular spring 24, also shown in FIGS. 7a and 7b, is arranged in the area of ratchet pawls 23 and which rings the ratchet carrier and its attendant pawls by an angle 104 more than 360° and stresses ratchet pawls 23 such that the free end of said pawls 23 is raised and enters into a position of engagement with the rotator grooves.

A collar 28 is screwed onto a section of the pawl carrier 22 to the right of ratchet pawls 23. Collar 28 comprises an inner bearing seat in which a grooved ball bearing 30 is arranged in order to rotatably support said pawl carrier relative the hub axle. For realizing the axial fixing, the hub axle has 2 stop situated in the bearing seat section corresponding to said stop 35 on the left side of the hub. A spacer disk 11 and another grooved bell bearing 2 adjoin at said grooved ball bearing 30, which supports the rotator relative the hub axle. A disk, retaining member 10 respectively, is disposed concentrically to said spacer disk 11 to secure the outer bearing shells of said grooved ball bearings 2 and 30 on the right side against any axial displacement.

For shielding against dust and water, a dust shield gasket 14 and a right adapter ring 12 adjoin on the right-hand side of the hub at the grooved ball bearing 2, which likewise has a cylindrical section on which an essentially V-shaped sealing ring 18 is arranged. Like the opening of the V of sealing ring 26, the opening of the V of sealing ring 18 likewise points radially outwardly. The sealing wall of the sealing ring orientated toward the hub center terminates in contiguous contact with said dust shield gasket 14.

A checked or knurled disk 17 screwed on an end section forms the termination of the hub axle on its right-hand side.

In another embodiment, the left adapter ring 13 comprises a groove along the inner peripheral surface, which is aligned exactly with a groove along the outer peripheral surface of the hub axle. An O-Ring made of a flexible material is arranged in both grooves and induces on the one hand that the adapter ring can be pulled off the hub axle manually without the use of tools and, on the other hand, ensures that the adapter ring does not come off of the hub axle unintentionally or undergo any displacement thereupon.

In dismantling the hub for purposes of maintenance according to the embodiment represented here, after the checked or knurled disk 17 is removed, said maintenance may then be performed without the need for any further tools.

A groove 37 is arranged at the right and of the hub shell 1 along the Inner peripheral surface of said hub shell and which is of a rounded-off shape in the sectional view as represented in FIG. 1. A V-shaped sealing ring 9 is likewise arranged on an outer peripheral surface of the rotator. The opening of the V of sealing ring 9 is aligned axially, pointing away from the hub renter.

Groove 37 and sealing ring 9 are so configured that only a narrow gap remains between hub shell 1 and rotator 5. Upon occurrence of water entering through this narrow gap, the outwardly pointing sealing wall of V-shaped sealing ring 9 is pressed radially outwardly and thus, consequently, against peripheral groove 37. This means that upon an occurrence of water or of dust, the sealing effect of sealing ring 9 is automatically intensified since an admission of water causes a spreading of said two sealing walls of sealing ring 9 and, consequently, a heightened sealing effect.

Figure 2A:
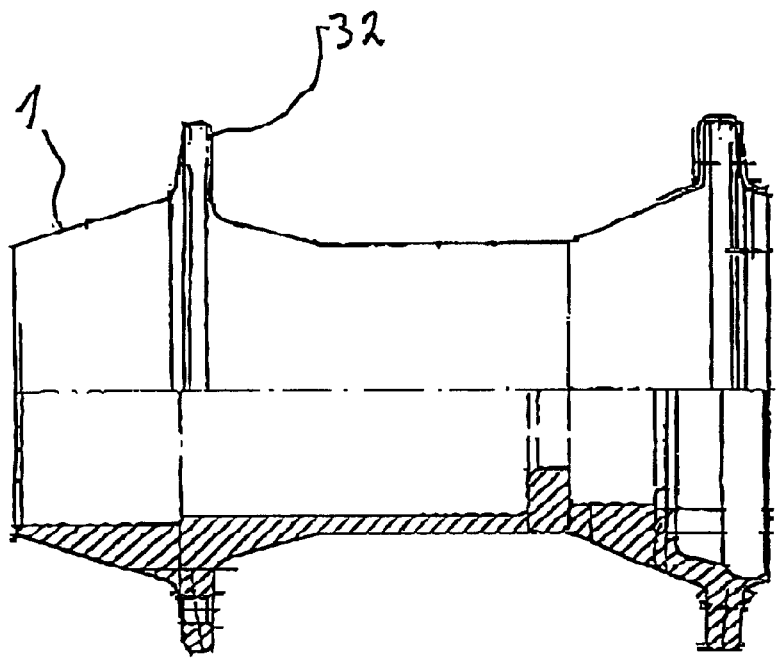
FIG. 2a a semi-sectional view of the hub shell of the embodiment according to FIG. 1.

The hub shell 1 in FIG. 2a is represented normally in its upper half and sectionally in its lower half.

Figure 2B:
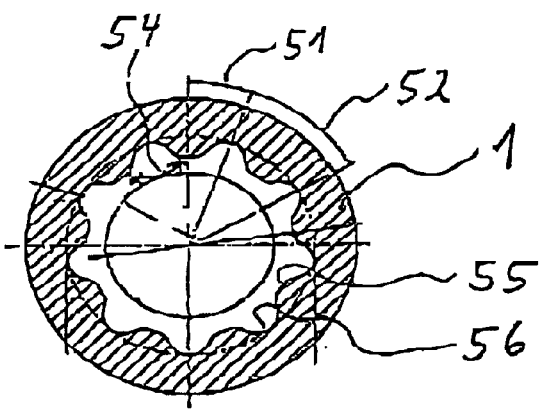

FIG. 2b represents a cross-section of the hub shell at the stop 38. The central, continuous opening through the hub shell has a polygonal shaped outer profile in the section of said stop 36, in which nine projections 55 and bulges 56 are symmetrically arranged along the periphery in radial direction. The angle 52 from one bulge to the next is a 40° angle; the angle 51 between a bulge and the next projection is a 20° angle. The angle 54 between the two ascending sides of a bulge is a 50° angle.

Figure 3:
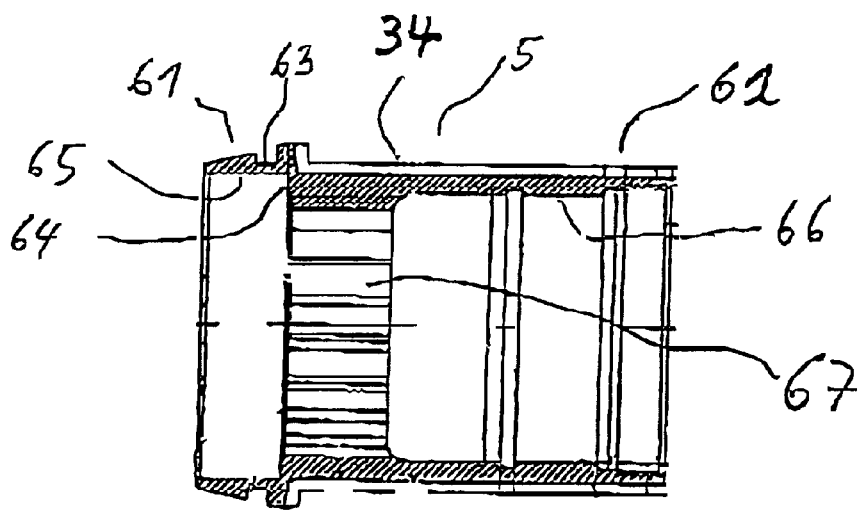
FIG. 3 a sectional view through the rotator of the embodiment according to FIG. 1.

FIG. 3 represents a longitudinal sectional view of rotator 5 of the embodiment according to FIG. 1. At a left end section 61, said rotator is provided with an external groove 63 which serves to receive sealing ring 9 for the purpose of axially fixing same.

A bearing seat 65 is arranged on the inner peripheral surface at the left end section 81 which serves for receiving the grooved ball bearings 31 for supporting the rotator relative the ratchet carrier, respectively the hub shell. Said grooved ball bearings 31 are axially fixed to the right by means of a radial stop.

A pinion receiving section 34 is provided on the outer peripheral surface for receiving the plurality of (up to 10) pinions. A bearing seat 66 is provided on an inner peripheral surface near the right end section 62 which serves for receiving the grooved ball bearing 2 for supporting the rotator relative the hub axle.

Axial grooves 67 are symmetrically distributed across the circumference on an inner peripheral surface near end section 61 into which the ratchet pawls 23 of ratchet carrier 22 engage in order to transmit a rotator torque in direction of travel to the hub shell.

Figure 4A:
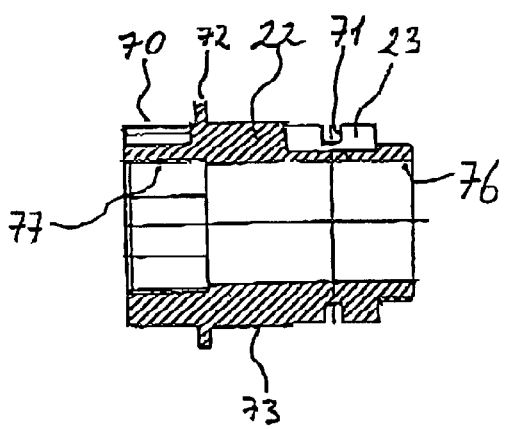
FIG. 4a a sectional view through the freewheel carrier means of the embodiment according to FIG. 1.

FIG. 4a represents a longitudinal:sectional view of ratchet carrier 22 on which ratchet pawls 23 are arranged. A groove 71 serves for receiving the annular spring 24 which pretensions the pawls in direction of engagement and which rings the pawls and the ratchet carrier at an angle of more than 360°. Such a configuration has the advantage that after the rotator has been extracted, pawls 23 on ratchet carrier 22 are held in place by means of spring 24 which thus excludes any individual components and parts from failing out of the hub.

The grooved ball bearings 31 provided for supporting the rotator relative the ratchet carrier are mounted on an outer surface 73 in a central section of the ratchet carrier. A radial ring projection 72 adjoining the bearing receiving section 73 serves for axially fixing the two grooved ball bearings 31 to the left. In the determinate configuration of the hub according to the present invention, the hub axle 4 protrudes through the central borehole 76 of said ratchet carrier. A female threading 77 is provided on a left end section of said ratchet carrier into which screw 29 is screwed in order to connect the ratchet carrier with the hub shell 1. A polygonal section 70 is disposed on the left end outer surface of said ratchet carrier 22.

Figure 4B:
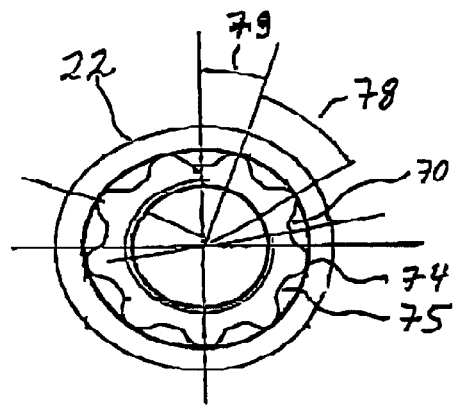
FIG. 4b a frontal view of the freewheel carrier means of the embodiment according to FIG. 1.

FIG. 4b represents a side view of said ratchet carrier 22 with said polygonal section 70 in which nine projections 74 and nine recesses 75 are arranged circumferentially and symmetrically alternating. The angle 78 between two radial projections 74 is an approximate 40° angle and the angle 79 between a recess and the next projection is a 20' angle.

Figure 5:
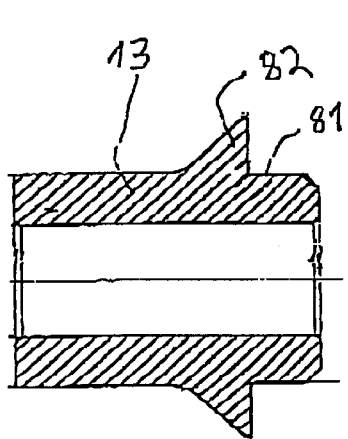
FIG. 5 the left adapter ring of the embodiment according to FIG. 1.

FIG. 5 represents a left adapter ring 13 comprising a cylindrical section 81 for receiving the seal 26 and a radial projection 82. The side of the radial projection 82 orientated towards the hub center has an angle of 90° to the hub axle, while the angle of the side orientated outwardly drops to 45° to the hub axle.

Figure 6:
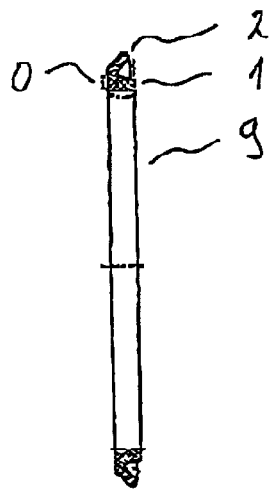
FIG. 6 the sealing means between the rotator and the hub shell of the embodiment according to FIG. 1.

FIG. 6 represents sealing ring 9, which is formed in the shape of a V and has two sealing walls, sealing lips respectively. The first sealing wall 91 lies parallel to the axle in groove 63 of rotator 5, While the second sealing wall 92 of seal 9 is aligned radially outwardly towards groove 37 as represented in FIG. 1.

List of Reference Numbers 1 hub shell
2 grooved ball bearing
3 hub
4 hub axle
5 rotator
9 seal
10 disk
11 spacer disk
12 right adapter ring
13 left adapter ring
14 dust cap
17 knurled disk
18 seal
22 ratchet carrier
23 ratchet pawl
24 annular spring
26 seal
28 bearing carrier
29 screw
30 grooved ball bearing
31 grooved ball bearing
32 flange
33 borehole
34 sprocket receiving surface
35 stop
36 stop
37 groove
38 stop
39 bearing seat
51 angle
52 angle
54 angle
55 projection
56 bulge
61 end section
62 end section
63 groove
64 stop
65 bearing seat
66 bearing seat
67 groove
70 polygonal section
71 groove
72 ring projection
73 bearing receiving section
74 projection
75 recess
76 borehole
77 female threading
78 angle
79 angle
80 sealing ring
81 cylindrical section
82 radial projection
91 first sealing wall
92 second sealing wall

What is claimed is:

1. A freewheel hub comprising:
   a hub axle,
   a hub shell arranged substantially concentrically to said hub axle,
   at least one hub shell roller bearing for supporting said hub shell such that said hub shell is rotatably mounted with respect to said hub axle,
   a rotator arranged substantially concentrically and rotatably to said hub axle on which at least one gear ring is disposed, whereby at least one rotator roller bearing is disposed on said rotator such that said rotator is rotatably mounted relative to said hub shell in at least one rotational direction, and
   a freewheel means, provided with a ratchet pawls, configured so that a torque in the drive direction is transmitted to said hub shell, whereby said rotator roller bearings and said hub shell roller bearings comprise roller bodies disposed at a predetermined distance from one another,
   characterized in that
   said ratchet pawls or the roller bodies of the rotator roller bearings and the hub shell roller bearings cannot fall out of the hub after the rotator has been extracted.

2. The hub according to claim 1, wherein said roller bodies of each roller bearing are retained in their predetermined distance by a bearing cage.

3. The hub according to claim 1, wherein at least one of said roller bearings is maintenance-free and comprises a seal for protection against dust or water.

4. The hub according claim 1 wherein at least one of said roller bearings is a deep groove ball bearing.

5. The hub according to claim 2 wherein said rotator is rotatably mounted relative said hub shell with at least one grooved ball bearing, whereby each of said at least one roller bearings comprises only one bearing cage without inner or outer rings to keep the structural dimension in radial direction small.

6. The hub according to claim 2 wherein said rotator is rotatably mounted relative said hub shell with at least one needle bearing, whereby each of said at least one roller bearings comprises only one bearing cage without inner or outer rings to keep the structural dimension in radial direction small.

7. The hub according to claim 1 wherein a freewheel carrier device is provided which is rigidly connected to said hub shell.

8. The hub according to claim 7 wherein at least one ratchet pawl is arranged in peripheral distribution on a central section of said freewheel carrier device.

9. The hub according to claim 8 wherein said central section comprises a groove in which a spring is arranged for biasing at least one of said ratchet pawls.

10. The hub according to claim 9 wherein said spring rings extend about said freewheel device by an angle of more than 360 degrees.

11. The hub according to claim 1 wherein said hub may be disassembled without using tools.

12. The hub according to claim 1 wherein said rotator may be manually extracted from said hub without the need for tools.

13. The hub according to claim 1 wherein the ratchet pawls or the roller bodies of the roller bearings cannot fall out of the hub after the rotator has been extracted.

14. The hub according to claim 1 further comprising an adaptor ring attached to one or both side ends of said hub shell.

15. The hub according to claim 14 wherein said adaptor ring is screwed onto said hub shell.

16. The hub according to claim 14 wherein said adaptor ring is pressed onto said hub shell.

17. A freewheel hub comprising:
- a hub axle,
- a hub shell arranged substantially concentrically to said hub axle,
- at least one hub shell roller bearing for supporting said hub shell such that said hub shell is rotatably mounted with respect to said hub axle,
- a rotator arranged substantially concentrically and rotatably to said hub axle on which at least one gear ring is disposed, whereby at least one rotator roller bearing is disposed on said rotator such that said rotator is rotatably mounted relative to said hub shell in at least one rotational direction, and
- a freewheel means, provided with a ratchet pawls, configured so that a torque in the drive direction is transmitted to said hub shell, whereby said rotator roller bearings and said hub shell roller bearings, comprise roller bodies disposed at a predetermined distance from one another, characterized in that
an annular recess having a rounded cross section is arranged along the inner peripheral surface to the right hand side of said hub shell, on the side on which said rotator is disposed and said sealing means is arranged substantially between said rotator and said hub shell in a section of said annular recess and is configured such that an increase in external pressure induces an intensification of the sealing effect and that said sealing means is V-shaped and is positioned between said rotator and said hub shell such that the tip of the V-shaped sealing means is directed to the center of said hub.

18. The hub according to claim 17, wherein said roller bodies of each roller bearing are retained in their predetermined distance by a bearing cage.

19. The hub according to claim 17, wherein at least one of said roller bearings is maintenance-free and comprises a seal for protection against dust or water.

20. The hub according claim 17 wherein at least one of said roller bearings is a deep groove ball bearing.

21. The hub according to claim 18 wherein said rotator is rotatably mounted relative said hub shell with at least one grooved ball bearing, whereby each of said at least one roller bearings comprises only one bearing cage without inner or outer rings to keep the structural dimension in radial direction small.

22. The hub according to claim 18 wherein said rotator is rotatably mounted relative said hub shell with at least one needle bearing, whereby each of said at least one roller bearings comprises only one bearing cage without inner or outer rings to keep the structural dimension in radial direction small.

23. The hub according to claim 17 wherein a freewheel carrier device is provided which is rigidly connected to said hub shell.

24. The hub according to claim 22 wherein at least one ratchet pawl is arranged in peripheral distribution on a central section of said freewheel carrier device.

25. The hub according to claim 24 wherein said central section comprises a groove in which a spring is arranged for biasing at least one of said ratchet pawls.

26. The hub according to claim 25 wherein said spring rings extend about said freewheel device by an angle of more than 360 degrees.

27. The hub according to claim 7 wherein said hub may be disassembled without using tools.

28. The hub according to claim 17 wherein said rotator may be manually extracted from said hub without the need for tools.

29. The hub according to claim 17 further comprising an adaptor ring attached to one or both side ends of said hub shell.

30. The hub according to claim 29 herein said adaptor ring is screwed onto said hub shell.

31. The hub according to claim 29 herein said adaptor ring is pressed onto said hub shell.

32. The hub of claim 30 or 31, wherein the adaptor comprises at least one sealing means.

33. The hub according to claim 17 wherein a first sealing wall of said V-shaped sealing means disposed between said rotator and said hub shell is positioned against said rotator, and a second sealing wall of said V-shaped sealing means protrudes into and contacts said annual recess.

34. The hub according to claim 17 wherein at least one of said sealing means comprises a labyrinth seal.

35. The hub of claim 30 or 31, wherein the adaptor comprises at least one sealing means.

36. The hub according to claim 17 wherein a first sealing wall of said V-shaped sealing means disposed between said rotator and said hub shell is positioned against said rotator, and a second sealing wall of said V-shaped sealing means protrudes into and contacts said annual recess.

37. The hub according to claim 17 wherein at least one of said sealing means comprises a labyrinth seal.

* * * * *

UNITED STATES PATENT AND TRADEMARK OFFICE
CERTIFICATE OF CORRECTION

PATENT NO. : 6,557,684 B1  
DATED : May 6, 2003  
INVENTOR(S) : Gerrit Jager and Stefan Spahr It is certified that error appears in the above-identified patent and that said Letters Patent is hereby corrected as shown below:

<u>Title page, Item [54] and Column 1, line 1,</u>  
The title now reads "FREE-WHEELING HUB"; this should read -- FREE WHEEL HUB --

<u>Column 14,</u>  
Line 20, "claim 7"; should read -- Claim 17 --

Signed and Sealed this

Ninth Day of September, 2003

JAMES E. ROGAN  
*Director of the United States Patent and Trademark Office*